United States Patent [19]

Lilja et al.

[11] 4,392,885

[45] Jul. 12, 1983

[54] METHOD AND APPARATUS FOR FORMING A DIRECTIONED SUSPENSION SPRAY OF A PULVEROUS MATERIAL AND A REACTION GAS

[75] Inventors: Launo L. Lilja; Valto J. Mäkitalo, both of Pori, Finland

[73] Assignee: Outokumpu Oy, Helsinki, Finland

[21] Appl. No.: 329,301

[22] Filed: Dec. 10, 1981

[30] Foreign Application Priority Data

Dec. 30, 1980 [FI] Finland ................................. 804053

[51] Int. Cl.³ ............................................... C22B 1/10
[52] U.S. Cl. .......................................... 75/26; 75/92; 110/265; 266/182; 422/213
[58] Field of Search ........................... 75/26, 9, 92, 91; 266/182; 110/264, 265; 422/213

[56] References Cited

U.S. PATENT DOCUMENTS 4,210,315  7/1980  Lilja et al. ................................ 75/92

FOREIGN PATENT DOCUMENTS 331555  7/1930  United Kingdom ................. 110/265

*Primary Examiner*—M. J. Andrews

*Attorney, Agent, or Firm*—Brooks, Haidt, Haffner & Delahunty

[57] ABSTRACT

The invention relates to a method and apparatus for forming a directioned and controlled suspension spray of a pulverous material and reaction gas in such a manner that the reaction gas directed along one, often horizontally approaching channel is divided into three or more partial channels by means of mainly radial partition walls. When necessary, guide blades or a venturi-like mixing and guide member is used. The reaction gas is deflected so as to have the desired direction, often vertically downwards so as to be parallel to the central axis of the reaction chamber, such as a flash-smelting furnace. The thus formed partial flows of reaction gas are often caused, furthermore, to discharge, divided further into two or more parts, as an annular flow encircling on each side the member for feeding pulverous material, situated in the middle of the flow, into the reaction chamber. The pulverous material, dispersed well only in the reaction chamber, is mixed effectively with this as a whole non-rotating but turbulent reaction-gas flow, the pulverous material being directioned mainly radially in order to achieve a velocity difference between the reaction gas and the pulverous material.

9 Claims, 7 Drawing Figures

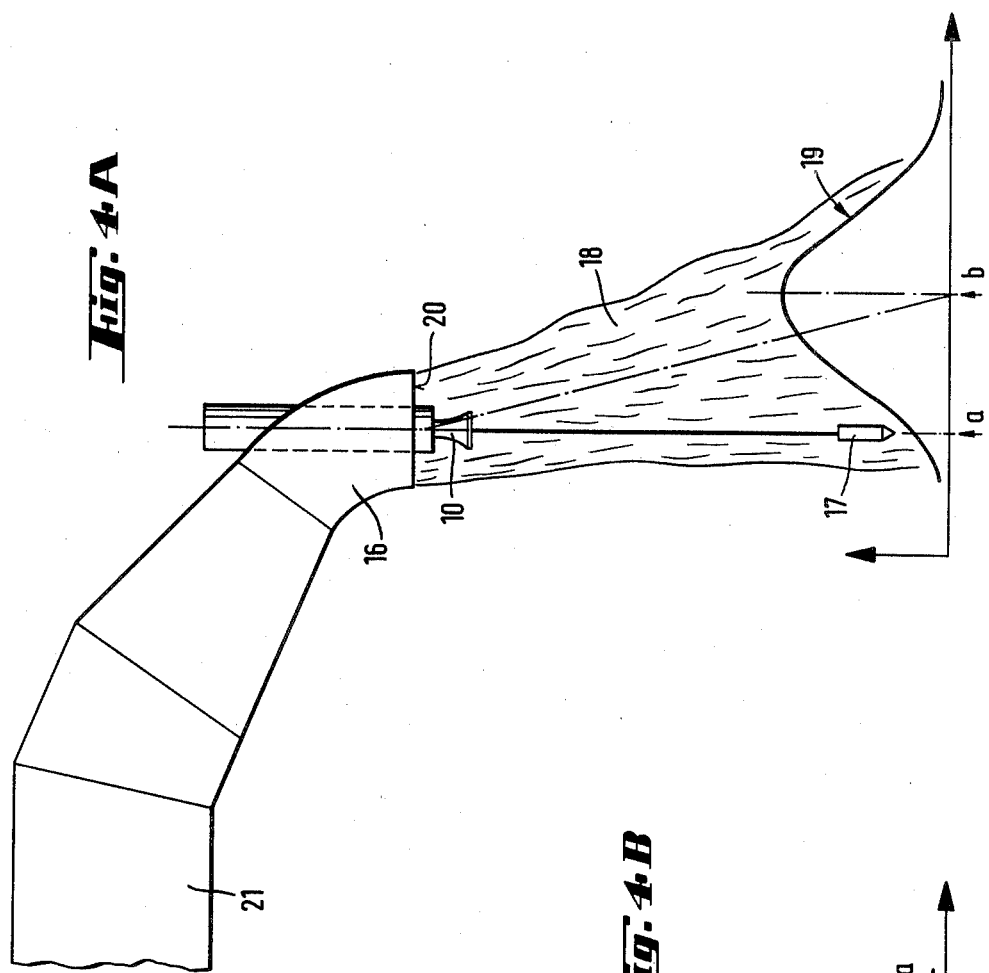
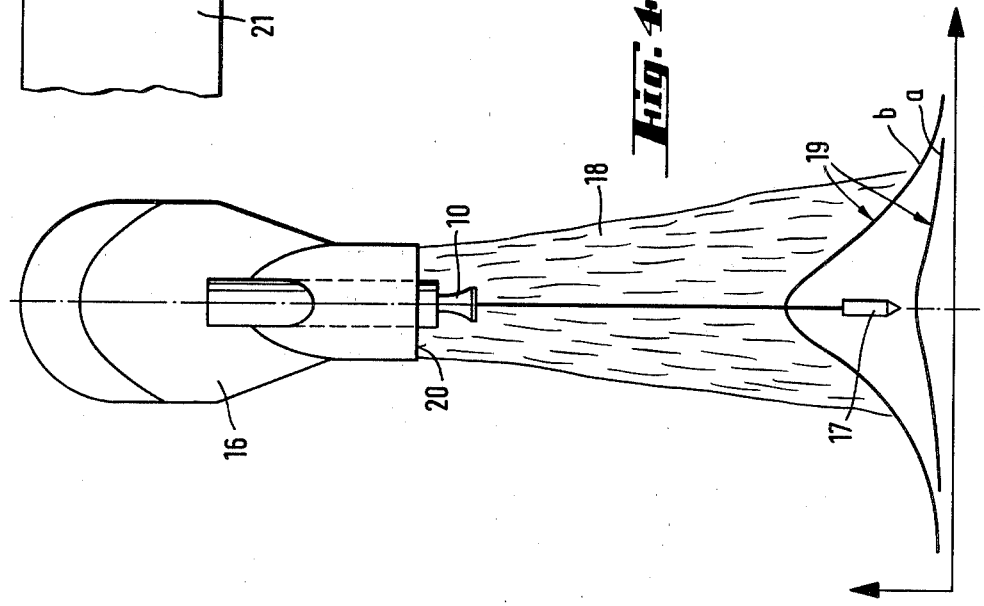

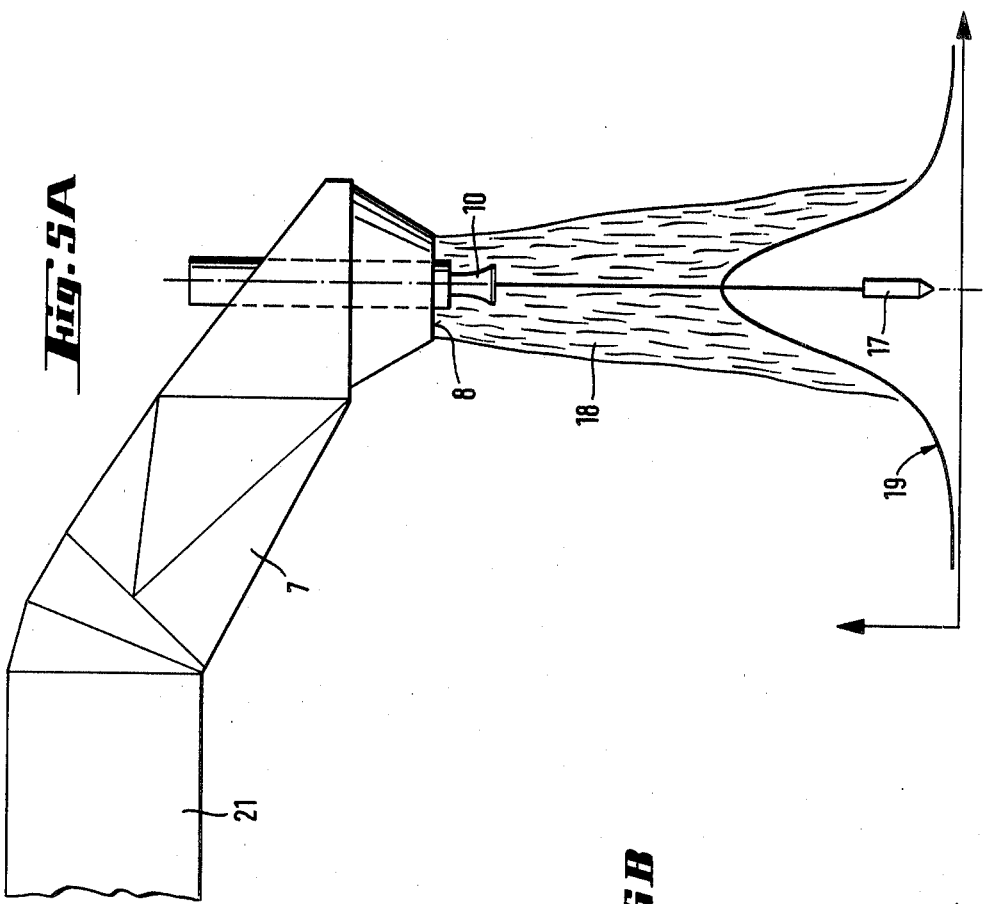
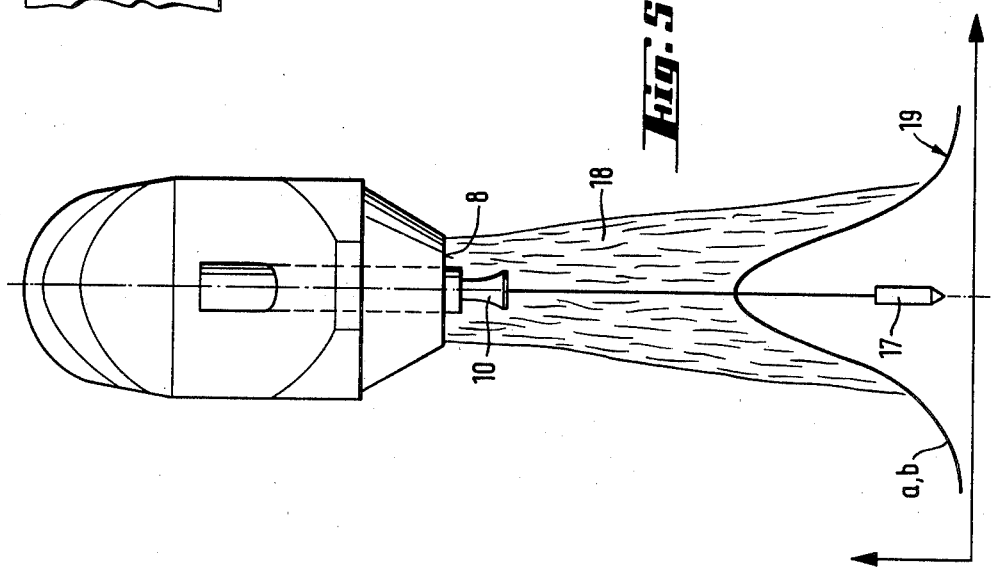

METHOD AND APPARATUS FOR FORMING A DIRECTIONED SUSPENSION SPRAY OF A PULVEROUS MATERIAL AND A REACTION GAS

BACKGROUND OF THE INVENTION

The present invention relates to a method and apparatus for forming a directioned and controlled suspension spray of a pulverous material and a reaction gas.

There are numerous descriptions in the literature of the feeding of a suspension into a reaction chamber. Most of them deal with either direct blowing of a pneumatically carried finely-divided solid material or apparatus in which the suspension spray is formed as if in an ejector by means of pressure pulses produced in the reaction gas, and is blown into the reaction chamber. Such a spray forms a cone in which the concentration of solid is highest in the center of the spray. The shape of the distribution is primarily dependent on the properties of the solid and the flow velocity of the suspension. The solid and the gas have in this case substantially the same direction.

As known, the transfer of mass between a reacting solid particle and the gas surrounding it is substantially dependent on the difference in velocity between them. For this reason it is important that the velocity difference is greatest or maximal in the reaction chamber itself. For this reason, mixing the reaction gas and the pulverous material in the reaction chamber itself is a more advantageous method of forming the suspension than is the ejector-like method described in the above-mentioned example. When the gas and the solid material are mixed in the reaction chamber, the velocity difference is at its greatest when the solid particles have not yet had the time to settle at the velocity of the gas flow.

As an example of such suspension-forming in the reaction shaft can be mentioned FI Pat. No. 57 786, in which the procedure is briefly as follows: An annular, downwards directed flow of solid is formed of a pulverous material by means of partial flows falling on an inclined surface. The reaction gas, which has been brought into a strong turbulent motion in a specific turbulence chamber, is allowed to discharge, parallel to its axis of rotation, via a throttling evening-out member at the end of the turbulence chamber, to inside the annular flow of the pulverous material. From this outlet, which opens directly into the reaction chamber, the strongly turbulent spray discharges as a cone the flare angle of which can be adjusted within a range of 15°–180°, and the spray meets, at the necessary velocity difference, the flow of pulverous material in the reaction chamber itself.

For effective and economical utilization of the reaction chamber, it is necessary that the suspension spray, whether formed before entering the reaction chamber or in the reaction chamber itself, has a controlled direction and spread.

For reactions it is important that the mixing ratio of reaction gas to pulverous material is correct at every point of the reaction chamber. Regarding the use of the space, it is also advantageous that the directioning and distribution device be as small as possible, and that the reaction chamber be as well filled as possible; however, in this case it is necessary to take into consideration the either wearing or thickening effect of the suspension spray on the walls. This leads to a need of controlled directioning of the suspension spray of the reaction gas and the pulverous material, usually symmetrically in relation to the reaction chamber, in spite of the difficulty due to the fact that the gases are often introduced into the reaction chamber at an angle awkward in relation to the main flow. One known method of directioning gas sprays is to make use of a strong rotary motion, as in the above-mentioned FI Pat. No. 57 786. This is often even necessary in processes which require very demanding reaction conditions. In this case, however, it is necessary to use a certain amount of pressure energy, in which there can often be achieved savings in less demanding processes.

Perhaps the simplest method of deflecting a gas flow, which often arrives in an almost horizontal direction, to a direction parallel to a vertical reaction chamber is to use an elbow pipe of uniform thickness. This has the advantage of simplicity and a rather small pressure loss, but also the disadvantage of an asymmetrical discharge gas flow. From the literature (Handbook of Fluid Dynamics, Victor L. Streeter, McGraw-Hill Book Company, Inc. 1961, pp. 3–18...3–23, 9–11, 14–16.) it is also known to change a pipe flow at the elbow of a pipe as the centrifugal forces have a stronger effect in the center of the pipe than on the sides, owing to the difference in the radii, thereby causing a concentration of the flow in the central area of the pipe towards the outer wall and thereby effects the formation of two vortices deflecting from the walls of the pipe. For suspension formation there has to be added inside the pipe elbow a tubular member for feeding pulverous material, and this member increases the rate of the one-sided gas discharge flow produced by the above-mentioned phenomenon, as well as the pressure loss.

Even a higher model than this is the sufficiently long (length/diameter is great) straight pipe commonly used for the directioning. In spite of its simplicity this pipe is usually too long (high) in metallurgical processes, and it is difficult to install inside it a replaceable feeding device for pulverous material. One conventional solution for deflecting and directioning of gas is to direct it via a relatively large chamber into the reaction chamber by throttling it sufficiently before discharge into the reaction chamber. For practical reasons (excessive discharge velocity or respectively too large a distribution chamber, and in both cases too great a pressure loss) it is often impossible to bring the throttling to a sufficient degree, in which case the directioning is not successful. Instead of one discharge outlet it is, of course, possible to use several of them (a grating), in which case higher discharge velocities can be used, D. R. Richardson in his article "How to design fluid-flow distributors", Chem. Eng., 68 No. 9, 83–86 (1961) has determined, for the grating, the value of pressure loss necessary for ensuring the evenness of the discharge rate prevailing in the openings of the grating, or of the distribution of the gas amount over the grating, the value having to be at least 100-fold compared with the pressure loss based on the inlet velocity. Even in this case the evenness and directioning can be achieved, but at the expense of a large size and a pressure loss.

Very good directioning is provided by a method of introducing the reaction gas into the gas distribution chamber located on the central axis of the reaction chamber, from three or several directions symmetrically and by allowing the thus symmetrically formed annular gas flow to discharge into the reaction chamber, and by feeding the pulverous material centrally from inside of the annular gas flow. This is advantageous and even recommendable when what is involved is the reduce into one the unit for forming a suspension of, for example, three or several reaction gases and a pulverous material, since in that case there are available already the gas distribution pipes to be connected to the distribution chamber. If, however, the question is of constructing a completely new unit, it is not worth making the above-mentioned distribution pipes owing to the great losses of material and heat; instead, it is advantageous to use the low single-channel gas-feeding unit with a small pressure loss according to the present invention.

Since in metallurgical smelting apparatus, especially in suspension smelting, there is required a device or devices by means of which the reaction gas and a pulverous material are fed into the reaction chamber to produce a good mixing with each other, it has been necessary to pay special attention to the method of forming the suspension, especially as the size of the smelting units is on the increase.

Two principles are used for feeding a suspension of a reaction gas and a pulverous material into a reaction chamber, and according to these principles the suspension is formed either prior to the actual blow-feeding device or by means of the blow-feeding device itself.

The former method is used in the conventional carbon burners of carbon dust heating or in metallurgical apparatus in which a pneumatically carried finely-divided ore or concentrate is blown, together with its carrier gas, directly into the reaction vessel. When this method is applied, the blow-feed velocity must be adjusted to such a rate that no blow-back of the reactions can occur. When high degrees of preheating are used or in other cases in which the suspension to be formed is very reactive, as in oxygen smelting of a metallurgical sulfide concentrate, the suspension must be formed as close as possible to the reaction chamber or, ideally, in the reaction chamber itself as according to the present invention.

The object of the present invention is to provide a method for forming a suspension, a method in which the first contact between the reacting materials occurs in the reaction chamber itself, so that it is also applicable to forming a suspension of highly reactive materials.

SUMMARY OF THE INVENTION

According to the present invention, a reaction gas directed along one, often horizontally entering channel is divided into three or several partial channels mainly by means of radial partitions departing from the center point of the mass of the flow. When necessary, guide blades and/or a venturi-like mixing and guide member is used. The reaction gas is deflected to the desired direction, often vertically downwards so as to be parallel to the central axis of the reaction chamber, such as the reaction shaft of a flash-smelting furnace. The thus formed partial flows of the reaction flow are caused to discharge, with as small a pressure loss as possible, into the reaction chamber as an annular flow which encircles on every side the feeding member for pulverous material located in the center of the flow. With this reaction-gas flow, which is as a whole non-rotating but turbulent, the pulverous material which is not dispersed well until the reaction chamber is mixed effectively in the reaction chamber, mainly radially in order to achieve a velocity difference between the reaction gas and the pulverous material.

By means of the suspension spray of the thus formed reaction-gas flow and the pulverous material mixed with it by means of a sufficient velocity difference, there is achieved within the entire discharging annular flow in the reaction chamber the turbulent mixing at controlled proportions, necessary for the reactions, as well as the desired direction in terms of wearing and/or heating up of the walls.

In accordance with the invention, the deflecting and controlled directioning of the reaction gas and the formation of a suspension of a pulverous material to be mixed with it are carried out in the reaction space itself by means of devices installed in its top, for example as follows:

Even though below, for the sake of clarity, there is described an application of the invention to a flash-smelting furnace, it does not mean that the invention could not be used in other metallurgical methods as well. The industrial-scale reaction gas amounts used in flash-smelting furnaces vary within the range $\dot{V}_n = 10{,}000 \ldots 14{,}000$ m$^3$/h and the pulverous metallurgical concentrate amounts within the order of $10 \ldots 130$ t/h, for which reason the reaction chamber (cylindrical reaction shaft) is high and has a large diameter. For this reason the reaction gas is normally directed upwards in parallel to the reaction shaft and adjacently to it, usually for the sake of simplicity, and along one insulated channel in order to eliminate heat losses.

The reaction gas can be air or oxygen-enriched air at room temperature. Usually the reaction gas is preheated to $200°\ldots 500°$ C., sometimes even approx. $900°$ C. In the upper section of the reaction shaft the gas channel turns in a horizontal direction towards the central axis of the reaction shaft.

In the present invention the final section of this horizontal channel is divided primarily into three partial channels, in which case no addition needs to be made to the thermal insulation as compared with the single-channel system. The aim is to start the partition walls at a point where the velocity distribution of the reaction gas in the cross secton of the channel is as symmetrical and even as possible. In relation to the direction of the flow the partition walls are radial, i.e. they all depart from the same line, parallel to the flow and situated in the center point of the mass of the flow, and they end at the channel wall. In a case of three partial channels, the normal practice is that one channel rises directly upwards from the central point of the mass and the remaining two are respectively downwards at angles of $120°$.

If the channel to be made is, for one reason or another, such that prior to reaching the partition walls the gas distribution will not be homogeneous enough, the following two methods can be helpful: in the immediate vicinity of the departure point of the partition walls there are provided adjustable guide blades by means of which it is possible to correct the distribution of the mass of the reaction gas into partial channels. The other method is to place, at a point prior to the partition walls, a suitable evening-out and mixing member, such as a venturi, which is known to be a good mixing member. This is an excellent method of mixing a second gas, for example oxygen, with the reaction gas.

The partial channels must be constructed in such a way that, when flowing in the channels, the reaction gas maintains the same velocity, or that, preferably, the velocity increases in the travel direction of the flow. Thus, in the structure this means a continuous decrease in the cross sections of the channels or their being maintained the same size at the maximum. This method is known to hinder the formation of secondary turbulences (back-eddies) which affect the direction of the flow.

The partial flow of reaction gas flowing along the partial channels are directed to encircle the usually tubular feed member for the pulverous material and are deflected 90°, i.e. so as to be parallel to the central axis of the reaction shaft.

Before the discharge point of the reaction gas into the reaction shaft there are placed in the discharge outlet vertical blades for halving each partial gas flow and to prevent any rotation which would hamper directioning. For this reason, when discharging into the reaction chamber as an annular flow from around the feeding, spreading and dispersing member for the pulverous material, the reaction gas is divided, in the case of a 3-channel gas channel, into six turbulent flows, whereby the rotation of the entire reaction-gas flow about the central axis is prevented.

The pulverous metallurgical concentrate is fed, primarily radially, into this reaction-gas flow from inside the gas flow by means of a suitable dispersing and spreading member for pulverous material. A very suitable means for feeding the pulverous material is, for example, the device described in U.S. Pat. No. 4,210,315, in which use is made of the falling energy of the pulverous material by means of optimization of the shape of the concentrate dispersing member in the reaction chamber, and of several effective gas sprays.

Sometimes, owing to the size of the reaction chamber, it is necessary to use several members for forming a suspension spray of a reaction gas and a pulverous material. In this case they are placed in the top of the reaction chamber, suitably in a symmetrical position, applying the abovementioned principles to each separately. In the placement and in the directioning of the suspension spray in the reaction chamber it is necessary to take into account the degree of fullness of the chamber and the closeness of the walls, in order to prevent wear and encrustatiions. For this reason the directioning angle may deviate somewhat from the direction of the central axis of the reaction chamber. The most important advantages of the present invention are:

only one channel divided into partial channels (thermal insulation, cost of material, space requirement, etc.)

small loss of pressure, advantageous especially in the case of large amounts of gas simple and low construction (makes it possible to construct a feeding device for pulverous material such as described in U.S. Pat. No. 4,210,315, thereby saving height and making the feeding device for pulverous material lighter)

directions the reaction gas spray in the desired and controlled direction.

DESCRIPTION OF THE DRAWINGS

FIG. 4 depicts the discharge of reaction gas from an elbow pipe, 4A side view, 4B end view;

FIG. 5 depicts the discharge of reaction gas from a device according to the present invention, 5A=side view, 5B=end view.

DESCRIPTION OF THE PREFERRED EMBODIMENT

Figure 1:
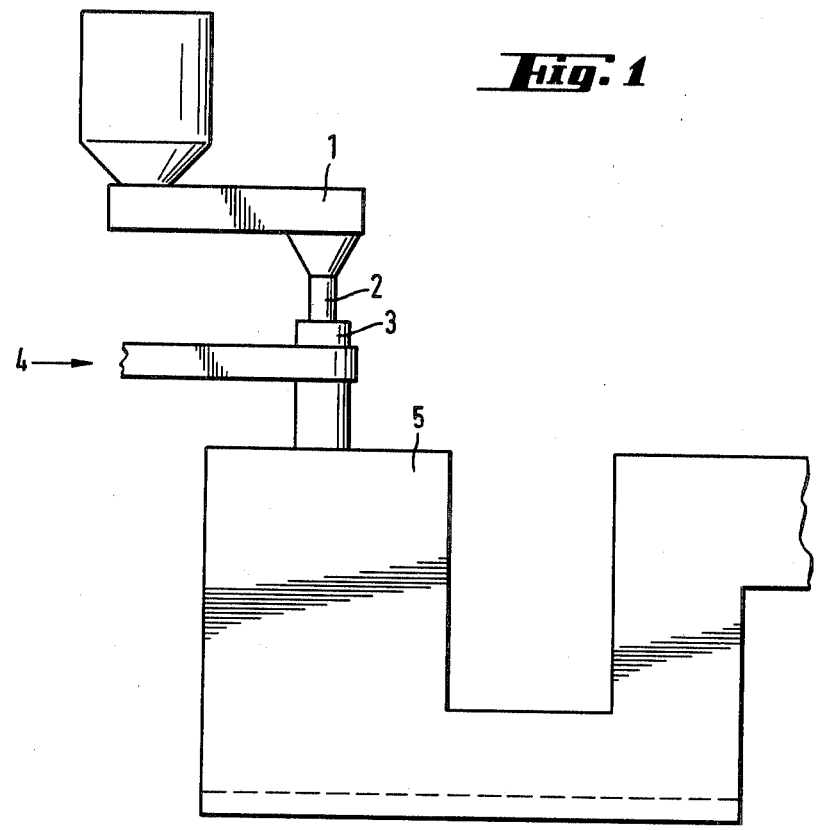
FIG. 1 depicts schematically one item of application of the invention, a flash-smelting furnace.
Figure 2:
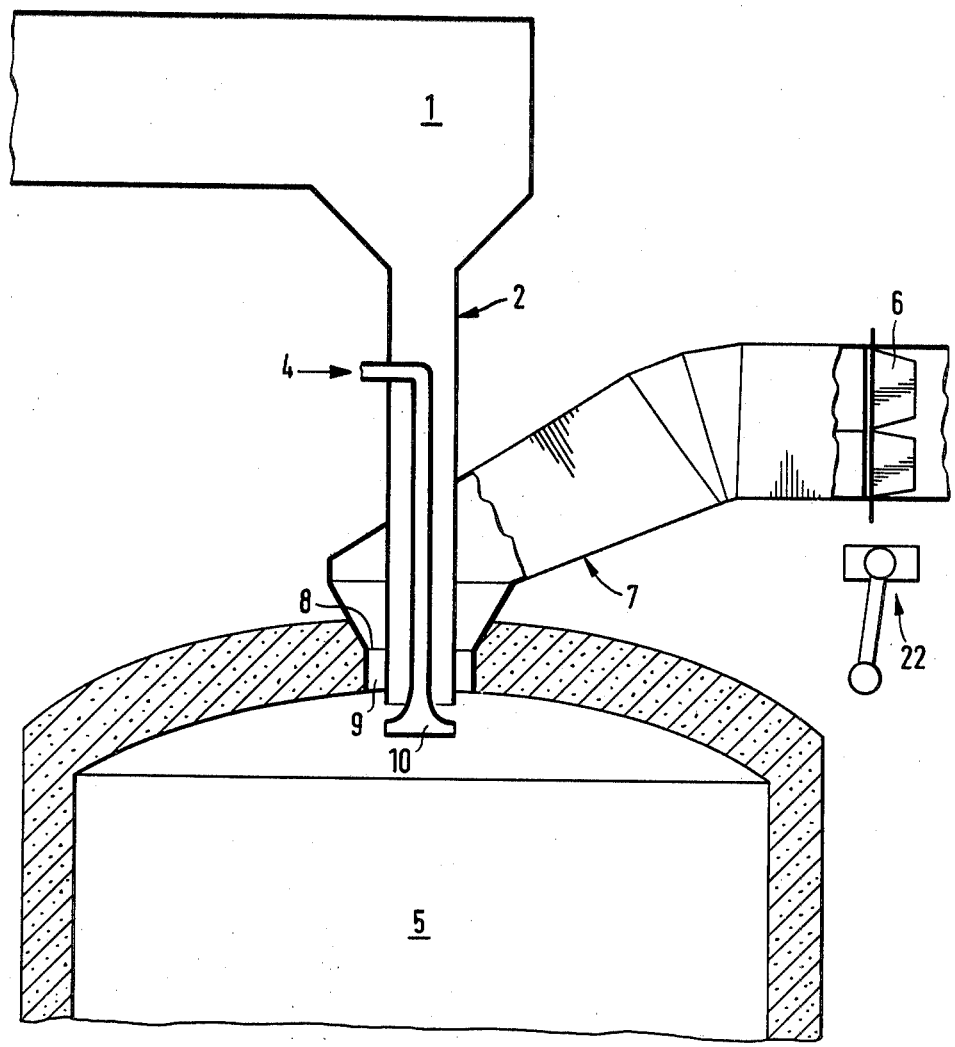
FIG. 2 depicts a diagrammatic vertical section of a preferred embodiment of the invention.

In FIG. 1, reference numeral 1 indicates a conveyor by means of which a pulverous material is transferred to the upper end of the discharge pipe 2 so that pulverous material falls continuously through the discharge pipe which, as shown in greater detail in FIG. 2, extends through the reaction-gas feed outlet 9 at the upper end of the reaction chamber 5. Reaction gas 4 is fed via the channel 3 through the outlet 9 into the reaction chamber 5 from around the discharge pipe 2.

In FIG. 2, the quantitative distribution of the reaction gas into the different partial channels is corrected by means of guide blades 6, the cross sectional surface of the partial channels either remaining constant or decreasing in section 7 of the deflection-channel system. The section which actually directions the reaction gases ends at point 8, from where the gases, having obtained their final direction, continue through an outlet 9 in the vault of the reaction chamber into the reaction chamber 5. The pulverous material is introduced into the reaction chamber along a discharge pipe 2, for example by means of a dispersing device 10 according to U.S. Pat. No. 4,210,315, in order to form a good suspension; reference numeral 22 indicates the supporting structures of the furnace.

Figure 3:
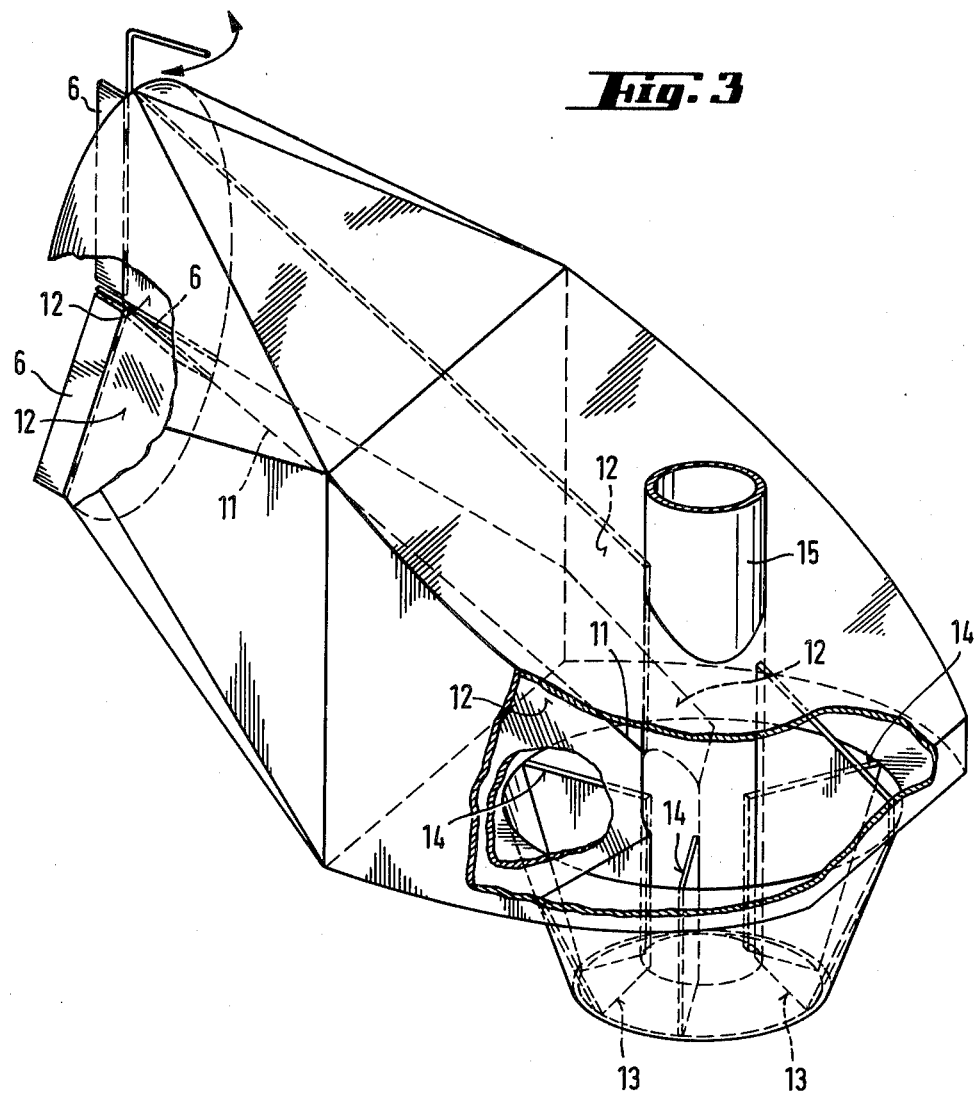
FIG. 3 depicts in greater detail the structure of the device depicted in FIG. 2, partly in cross section, as an oblique axonometric representation.

FIG. 3 shows the guide blades 6 and, as their continuations, the partition walls (12) starting at a line 11 which passes via the center point of the mass of the gas amount. The partition walls continue and end at point 13. The partial channels are divided into two at point 14. There is a pipe 15 for the member 2 for feeding the pulverous material.

FIG. 4A shows a side elevation, drawn on the basis of experimental results, of the discharge spray 18 of a reaction-gas flow from an elbow pipe 16. Its deviation from the vertical can be observed from the perpendicular 17. The velocity profile 19 has been plotted, on the basis of experimental results, from a plane, parallel to the plane of the figure and passing via the central point of the discharge outlet 20, the plane at the same time passing through the velocity maximum of the spray (Example 1).

FIG. 4B shows, in accordance with the same Example 1, the device of the previous FIG. 4A turned 90°, i.e. an end view illustrating the same results, and in it there has been plotted profile a from a plane passing through the central point of the discharge outlet and profile b from a plane which passes through the velocity maximum and is parallel to the plane of the figure.

FIG. 5A depicts, plotted on the basis of Example 2, a reaction-gas discharge spray 18 from a device according to the invention and its deviation from the perpendicular 17, as well as the measured velocity profile 19, all as a side view.

FIG. 5B shows, in the manner of FIG. 4B, an end view of FIG. 5A according to Example 2, i.e. turned 90°.

The invention is described below in greater detail with the aid of examples.

EXAMPLE 1

For the sake of comparison, measurement was carried out using a reaction-gas direction deflector of maximum simplicity, i.e. an elbow pipe 16, in which there was fitted a member 10 for dispersing pulverous material (FIGS. 4A and 4B). The temperature of the reaction gas (air) was 300 K. The diameter of the air-discharge outlet 20 was 82.5 mm and the diameter of the member 10 for dispersing pulverous material was 34 mm. The amount of air in the experiment was $\dot{V}_n = 100$ m$^3$/h.

The air spray 18 discharging from the pipe elbow and the velocity profile 19 measured at a distance of 375 mm from the discharge outlet 20 have been plotted in FIGS. 4A and 4B. Both the side view (4A) and the end view (4B) show the deviation of the direction from the perpendicular 17, either as regards the direction of the spray 18 or the measured velocity profile 19.

The coefficient $\zeta$ determined using different amounts of air ($\dot{V}_n$) on the basis of the pressure loss ($\Delta p$) between point 21 and the surroundings was 1.27 as calculated according to formula $$\Delta p = \zeta \frac{\rho w^2}{2}$$

where P=total loss of pressure from the measuring point to the surroundings/Pa, $\zeta$=total pressure loss coefficient, $\rho$=air density/kg/m$^3$, w=velocity of air in the discharge outlet m/s.

EXAMPLE 2

Measurement was also carried out using the device according to the invention (FIGS. 5A and 5B), as in Example 1. The diameter of the discharge outlet 8 was 75 mm and the dispersing member 10 was the same as in Example 1. The temperature of the air was 300 K. and its amount was $\dot{V}_n = 100$ m$^3$/h.

FIGS. 5A and 5B show, in the same way as FIGS. 4A and 4B of Example 1, the respective results of experiments using the device according to the invention. The success of the directioning can again be compared by means of the perpendicular 17.

At the same time, the total pressure loss coefficient, $\zeta = 1.85$, was measured in the manner of Example 1, velocity w being the velocity of gas at the discharge outlet 8.

EXAMPLE 3

A concentrate burner according to the invention (diameter of discharge outlet D$_o$=195 mm, diameter of the turnable inlet channel D$_i$=230 mm and its height at the central axis of the feeding and distribution member for pulverous metallurgical material, H=175 mm) was used in a semi-industrial-scale experimental flash-smelting furnace ($\phi$1.35 m) under the conditions m (reaction gas)=0.36 kg/s, ṁ (concentrate)=0.61 kg/s (range used 0.40 ... 0.69 kg/s), a temperature of 1700 K. prevailing in the reaction chamber. The total pressure loss coefficient, as defined in Example 1, was $\zeta = 1.21$.

The meeting point of the concentrate and the reaction gas was in the reaction chamber, 50 mm below the vault of the reaction shaft.

On the basis of samples taken from the reaction shaft and on the basis of other studies, the directioning of the reaction gases was controlled in accordance with the requirements of the invention.

EXAMPLE 4

In the following example, the apparatus required by the invention is applied on an industrial scale, the total feed of a pulverous concentrate mixture being 20 kg/s and the amount of reaction gas 11 kg/s.

The reaction gas is pre-heated. The diameter of the discharge outlet will be D$_o$=750 mm and the diameter of the inlet channel D$_i$=1400 mm. At the central axis of the member for the feeding and distribution of the pulverous concentrate the height of the reaction-gas channel will be H=1300 mm. The pressure loss with this gas amount would be in the order of 0.5 kPa.

As can be seen from the calculations, the pressure loss is very small and the construction is low, in which case the length of the concentrate-dispersing member will be sufficiently small.

What is claimed is:

1. A method of forming a directioned and controlled suspension spray of a pulverous material and a reaction gas by causing the pulverous material to flow into a reaction chamber and by directing a flow of the reaction gas evenly around the flow of pulverous material, comprising dividing the uninterrupted reaction-gas flow into at least three partial flows and then deflecting the direction of the partial flows 30°–90° so as to be substantially parallel to the central axis of the reaction chamber, the velocity of the partial flows being simultaneously increased, causing the partial reaction-gas flows thus formed, with minimal pressure losses, to discharge as an annular flow encircling the flow of pulverous material fed from inside the flow, which is caused to discharge in the reaction chamber and to mix effectively with this reaction-gas flow, which is not rotated as a whole, in order to produce a turbulent but controlled suspension spray necessary for the reactions.

2. The method according to claim 1, in which the direction of the partial flows is deflected about 90°.

3. The method according to claim 1 or 2, in which, when the direction of the partial flows is deflected, their velocity is simultaneously increased or at least maintained unchanged.

4. The method according to claim 1, in which the partial flows of reaction gas, already deflected so as to be substantially parallel to the central axis of the reaction chamber, are each divided further into at least two separate partial flows, which together form an uninterrupted annular reaction-gas flow which surrounds the flow of pulverous material fed from its inside.

5. A reaction-gas distribution and directioning apparatus positioned around a pipe for feeding pulverous material in the upper section of a reaction chamber, in which the initially uninterrupted reaction-gas feed channel is divided into at least three partial channels by means of radial partition walls departing from the central point of the mass of the flow, the partial channels being turned 30°–90° so as to be substantially parallel to the central axis of the reaction chamber in such a manner that these partial channels encircle the pipe for feeding pulverous material, situated in the middle.

6. The apparatus according to claim 5, in which the partition walls are guide blades.

7. The apparatus according to claim 5, in which in the direction of the flow the cross sectional area of the partial channels decreases or remains at maximum the same size.

8. The apparatus according to claim 5, in which each partial-channel part substantially parallel to the central axis of the reaction chamber has at least one partition plate, the partition plates departing radially from the pipe for feeding pulverous material and dividing the partial channels into substantially equal parts.

9. The apparatus according to claim 5, in which the uninterrupted channel for feeding reaction gas comprises a venturi-like guide member to which a pipe for feeding additives is connected.

* * * * *